(12) United States Patent  
Megen et al.

(10) Patent No.: US 8,307,340 B2
(45) Date of Patent: Nov. 6, 2012

(54) HARDWARE ABSTRACTION IN EMBEDDED SYSTEMS

(75) Inventors: Friedrich van Megen, Wurselen (DE); Holger Kenn, Aachen (DE)

(73) Assignee: Microsoft Corporation, Redmond, WA (US)

( * ) Notice: Subject to any disclaimer, the term of this patent is extended or adjusted under 35 U.S.C. 154(b) by 1076 days.

(21) Appl. No.: 12/239,049

(22) Filed: Sep. 26, 2008

(65) Prior Publication Data

US 2010/0083210 A1   Apr. 1, 2010

(51) Int. Cl.
G06F 9/44 (2006.01)
G06F 9/445 (2006.01)

(52) U.S. Cl. ......... 717/120; 717/111; 717/124; 717/173
(58) Field of Classification Search .................. None
See application file for complete search history.

(56) References Cited

U.S. PATENT DOCUMENTS

| | | | |
|---|---|---|---|
| 6,658,600 B1 | 12/2003 | Hogdal et al. | |
| 7,069,206 B2 | 6/2006 | Movall et al. | |
| 7,073,059 B2 * | 7/2006 | Worely et al. | 713/168 |
| 2003/0135842 A1 | 7/2003 | Frey et al. | |
| 2003/0229685 A1 | 12/2003 | Twidale et al. | |
| 2005/0289510 A1 * | 12/2005 | Illowsky et al. | 717/107 |
| 2008/0092149 A1 | 4/2008 | Rowbotham et al. | |

OTHER PUBLICATIONS

Sztipanovits, et al. "Generative Programming for Embedded Systems", Retrieved at <<http://fountain.isis.vanderbilt.edu/publications/GSMC-Final.pdf>>, pp. 18.
Bunse, et al. "Applying a Model-based Approach for Embedded System Development", Retrieved at <<http://swerl.tudelft.nl/twiki/pub/Main/TechnicalReports/TUD-SERG-2007-020.pdf>>, "Report TUD-SERG-2007-020", 2007, pp. 14.
Bunse, et al. "Unifying Hardware and Software Components for Embedded System Development", Retrieved at <<http://www.st.ewi.tudelft.nl/~gross/Publications/Bunse_2006.pdf>>, Architecting Systems, LNCS 3938, 2006. pp. 120-136.
Lu, Pin-Hsien, "Dynamically Switching between Hardware Abstraction Models for Rapid Embedded Software Development", Retrieved at <<http://embedded.cs.ccu.edu.tw/~esl_web/LabThesisPaper/LuPinShiun_Thesis_2006.pdf>>, Aug. 24, 2006, pp. 68.

* cited by examiner

*Primary Examiner* — Chuck Kendall
(74) *Attorney, Agent, or Firm* — Capitol City TechLaw; Richard C. Irving (57) ABSTRACT

A system and a machine-implemented method are provided. The system may include a platform, in which one or more application domains may be specified. At least some of the application domains may abstract a hardware device. Partitioning of the system into a number of independent applications with fixed public interfaces may provide each application domain with isolation, or protection, from other application domains. Application domains may be specified via programming language constructs. An application, within one application domain, may access a hardware device, or software, in another application domain via similar generic interfaces provided in a managed code environment enforced by the platform.

20 Claims, 5 Drawing Sheets

HARDWARE ABSTRACTION IN EMBEDDED SYSTEMS

BACKGROUND

When designing and programming a desktop or server application, a high level of abstraction, with respect to underlying computer resources, provides scalability for the desktop or server application. A platform, such as, for example, a platform using .NET framework, developed by Microsoft Corporation of Redmond, Wash. may be employed to execute programs. A programmer, using service-based design and multi-threading techniques, may not be concerned with which part of a system executes a program because the platform provides the high level of abstraction.

Embedded systems are prevalent in today's computer systems. Embedded systems may be developed to be implemented with custom hardware and often are executed in real-time environments. Examples of embedded systems include, but are not limited to, mobile telephones, set-top boxes, personal-digital assistants (PDAs), telecommunication switching systems, aircraft systems, and spacecraft systems.

In embedded systems design, a high level of abstraction, as described above, may adversely affect the embedded systems making performance unpredictable. Further, specific aspects of hardware devices may be lost in the high level of abstraction. For example, physical connections to physical interfaces may be abstracted, but later may be re-introduced by using additional parameters in thread control functions, and I/O drivers. In addition, the high level of abstraction makes it impossible for a programmer to refer to a specific central processing unit (CPU) or CPU-like device without breaking the abstraction.

In systems, including, but not limited to, the .NET framework, to communicate with a hardware component, an application may communicate with a driver, executing proprietary code, which may then access the hardware component. Each different hardware component may use a different driver. As a result, the programmer learns how the application interfaces with each of the different drivers before programming the application to call the drivers.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A system and a machine-implemented method may be provided for providing hardware abstraction. The system may include a platform, which permits a user to specify one or more application domains, some of which may abstract a hardware device. Application domains are computational units that may execute program code in a managed code environment. Application domains may be isolated from other application domains by partitioning a software system into a number of independent applications with fixed public interfaces.

In some embodiments consistent with the subject matter of this disclosure, the platform provides the capability to create application domains via programming language constructs. An application, within an application domain may access a hardware device, or software, in another application domain via generic interfaces provided in the managed code environment. The platform may enforce managed code features, including, but not limited to code access security, code verification, non-functional constraint validation, and application domain isolation. The non-functional constraint validation may include, but not be limited to, information about a maximum running time for a function.

In some embodiments, an application, executing in a first application domain, may download code to a hardware device in a second application domain. When the hardware device executes the downloaded code, the hardware device may perform functions defined by the downloaded code. A generic interface may be defined, such that an application, executing in an application domain, within a managed code environment, may invoke one or more functions of the downloaded code executing in the hardware device. A generic interface may be defined, such that an application, executing in an application domain, within a managed code environment, may also invoke software, executing in another application domain, via a generic interface similar to a generic interface for downloading information by an application to a hardware device, or similar to a generic interface for invoking functions of the hardware device from an application.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

A method and a system are provided, in which a platform may execute an application in a managed code environment within an application domain. The managed code environment may be enforced by the platform and may provide a number of features to the application, including, but not limited to, memory management, thread execution, verification of code, execution of code, code access security, non-functional constraint validation, application domain isolation, and releasing of resources. One example of non-functional constraint validation may include, but not be limited to, a maximum running time for a function.

An application domain is a computational unit which may execute program code. The application domain may further be a target of communications and external events. Creation of an application domain, results in initialization of a computational unit and locking of associated resources, after which, the application domain may be ready to process communications and events. An application domain may be destroyed, resulting in a freeing of associated resources, after which the application domain may no longer be available for processing communications and events.

In some embodiments consistent with the subject matter of this disclosure, an application domain concept may be implemented in a .NET programming language within a .NET framework (or platform), which is available from Microsoft Corporation of Redmond, Wash. In other embodiments, a different platform may be employed. Resources, including, but not limited to, memory and CPU time, may be used by application domains. Other resources, such as, for example, hardware interfaces, may include, but not limited to, hardware interrupts, shared memory regions, direct memory access (DMA) channels, memory-mapped I/O regions, I/O buses, I/O pins, and shared or exclusive locks, may be defined as properties of an application domain.

Application domains may be isolated from other application domains by partitioning a software system into a number of independent applications with fixed public interfaces defined by an application programmer. Other access among the application domains may be blocked.

The platform may provide a capability to create application domains as a programming language construct that abstracts hardware components. Such application domains may provide hardware functions and software-implemented functions via a generic interface, which may be used for management functions, including, but not limited to, initialization, as well as actual hardware or software functions.

Exemplary Processing Device

Figure 1:
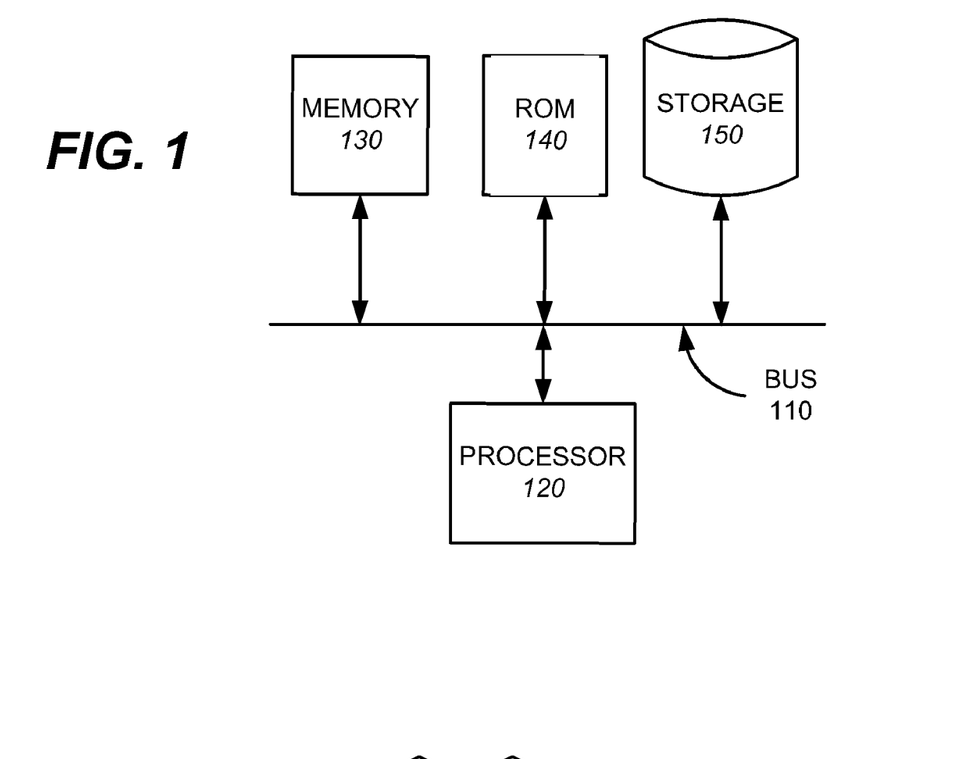
FIG. 1 illustrates a functional block diagram of an exemplary processing device, which may be used in embodiments consistent with the subject matter of this disclosure.

FIG. 1 is a functional block diagram of an exemplary processing device 100, which may be used to implement embodiments consistent with the subject matter of this disclosure. Processing device 100 may be a desktop personal computer (PC), a notebook or laptop PC, a server, a handheld processing device, or other processing device. Processing device 100 may include a bus 110, a memory 130, a read only memory (ROM) 140, a processor 120, and a storage device 150. Bus 110 may permit communication among components of processing device 100.

Processor 120 may include at least one conventional processor or microprocessor that interprets and executes instructions, as well as one or more embedded systems. Memory 130 may be a random access memory (RAM) or another type of dynamic storage device that stores information and instructions for execution by processor 120. Memory 130 may store temporary variables or other intermediate information used during execution of instructions by processor 120. ROM 140 may include a conventional ROM device or another type of static storage device that stores static information and instructions for processor 120. Storage device 150 may include a hard disk and corresponding drive, a flash-based storage device, or other type of storage device or medium for storing data and/or instructions for processor 120.

Processing device 100 may perform functions in response to processor 120 executing sequences of instructions contained in a tangible machine-readable medium, such as, for example, memory 130, ROM 140, storage device 150 or other medium. Such instructions may be read into memory 130 from another machine-readable medium or from a separate device via a communication interface (not shown).

Exemplary Application Domains

Figure 2:
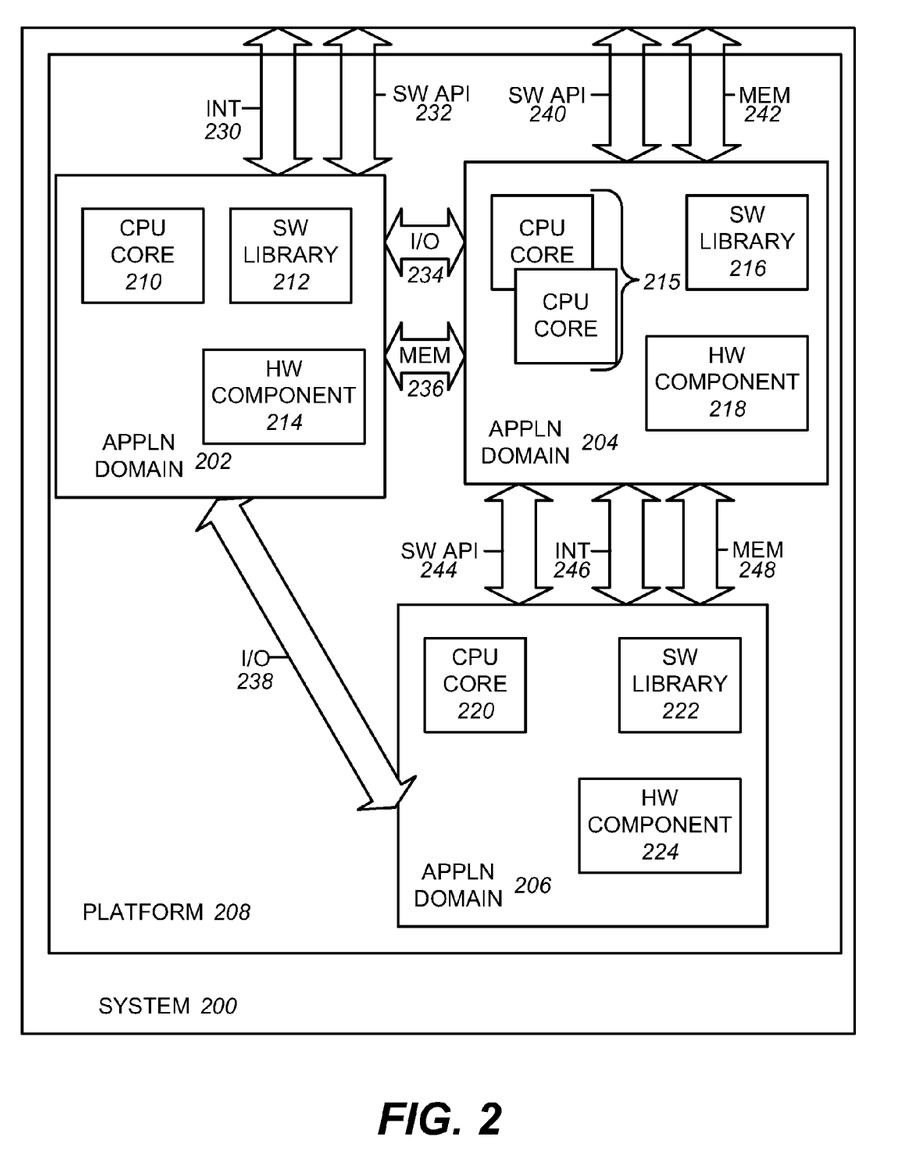
FIG. 2 illustrates an exemplary system, consistent with the subject matter of this disclosure, including multiple application domains.

FIG. 2 illustrates an exemplary system 200 that may be implemented in embodiments consistent with the subject matter of this disclosure. Exemplary system 200 may include application domain 202, application domain 204, and application domain 206 executing on a platform 208. Application domain 202 may include a CPU core 210, a software library 212, and a hardware component 214. Application domain 204 may include dual CPU cores 215, a software library 216, and a hardware component 218. Application domain 206 may include a CPU core 220, a software library 222 and a hardware component 224.

Application domain 202 may interface with other components, and vice versa, via an interrupt 230 and a software application programming interface (API) 232. Application domain 202 may interface with application domain 204, and vice versa, via an I/O bus 234 and a shared memory region 236. Application domain 202 may interface with application domain 206, and vice versa, via an I/O bus 238. Application domain 204 may interface with other components, and vice versa, via a software API 240 and a memory mapped I/O 242. Application domain 204 may interface with application domain 206, and vice versa, via a software API 244, an interrupt 246, and a shared memory region 248.

In some embodiments consistent with the subject matter of this application, platform 208 may be implemented via a Common Language Runtime (CLR), which is a virtual machine component of the .NET framework provided by Microsoft Corporation of Redmond, Wash. In other embodiments, platform 208 may be implemented via other means.

System 200 is only exemplary. Other systems may have more or fewer application domains with different components than the components shown in FIG. 2.

The above-mentioned hardware components may each be a programmable device. The programmable device may be a special purpose processor, including, but not limited to, a digital signal processor, or a graphic processor. In other systems, hardware components specified to be within application domains may include, but not be limited to, a field programmable gate array (FPGA), or an application specific integrated circuit (ASIC).

Figure 3:
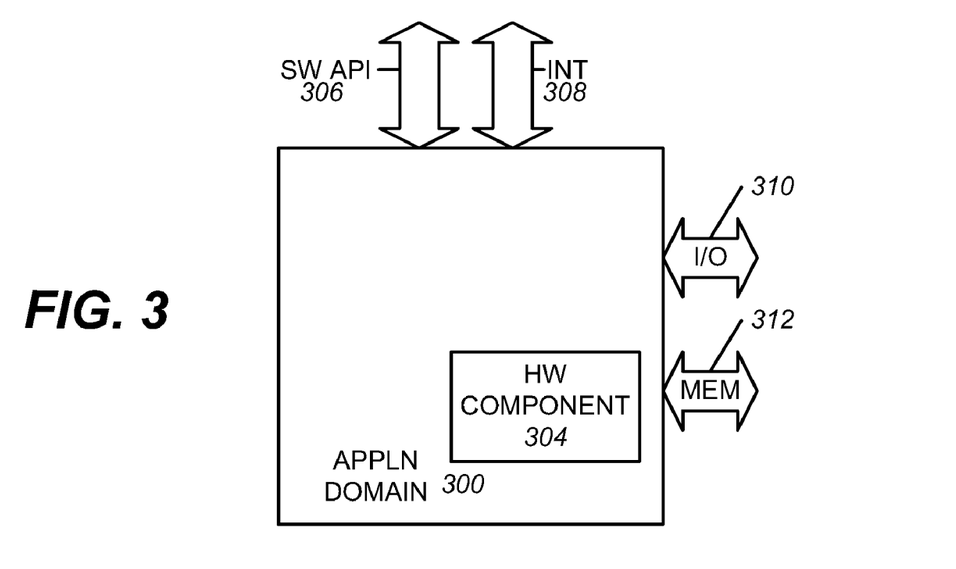
FIG. 3 shows an exemplary field programmable gate array-based application domain consistent with the subject matter of this disclosure.

FIG. 3 is a diagram illustrating an exemplary FPGA-based application domain 300 executing on a platform. FPGA-based application domain 300 may include a hardware component 304, which may be a FPGA. Because a FPGA may not have a software library, no software library is shown in FPGA-based application domain 300. FPGA-based application domain 300 may communicate with other components outside the application domain via a software API 306, an interrupt 308, an I/O bus 310, and a memory-mapped region 312.

FPGA-based application domain 300 is only exemplary. In other embodiments, an FPGA-based application domain may communicate with other components via other types of interfaces than those shown in FIG. 3.

Figure 4:
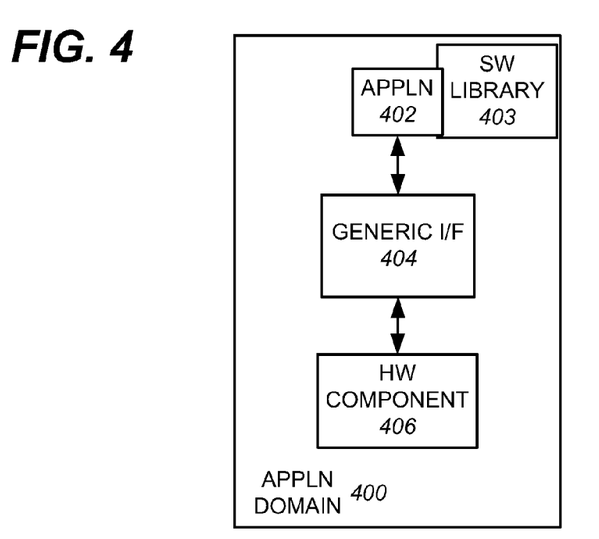
FIG. 4 is a functional block diagram of an exemplary application domain including an application and a hardware component in one application domain.

FIG. 4 illustrates a functional block diagram of an exemplary application domain 400 executing on a platform. The platform may provide a programming language construct for specifying an abstracted hardware component 406. A class for accessing hardware component 406 may be defined in a software library 403. An application 402 may instantiate an instance of the class for accessing hardware component 406. The instance of the class may provide a generic interface and may include one or more methods for communicating information to or from hardware component 406. In other application domains, a class for interfacing with a software component may be instantiated and may provide a generic interface, including one or more methods, for communicating with a software component.

The one or more methods for accessing hardware component 406 may include proprietary code provided by a manufacturer of hardware component 406, or a developer. The one or more methods may further include information, including, but not limited to, configuration information for hardware component 406.

Code may be downloaded to hardware component 406, using generic interface 404. The code may include code for implementing functions on hardware component 406. A developer of the code may provide a class including methods for calling the functions on hardware component 406. The class that includes methods for calling the functions may be instantiated by application 402, thereby providing a generic interface for calling the functions. As an example, hardware component 406 may be a digital signal processor (DSP) and the downloaded code may include instructions for the DSP to function as a video decoder. In this example, application 402 may call a function to pass encoded video to hardware component 406 and may call a second function to receive a decoded video image from hardware component 406.

Figure 5:
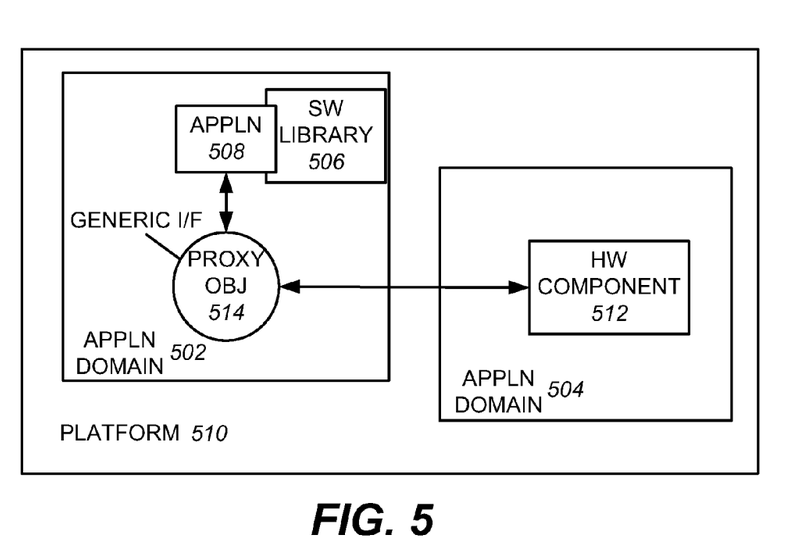
FIG. 5 is a functional block diagram illustrating one application domain with an application and another application domain with a hardware component accessed by the application.

FIG. 5 illustrates a functional block diagram including application domain 502 and application domain 504 being executed on a platform 510. Application domain 502 may include a software library 506, which may include one or more defined classes including methods for accessing one or more hardware components. Application 508 may instantiate a class from software library 506 for communicating with hardware component 512, specified to be in application domain 504. As a result of instantiating the class from software library 506 for communicating with hardware component 512, a generic interface, which in this example may include a proxy object 514, may be instantiated for communicating with hardware component 512 in application domain 504. Proxy object 514 may include methods, which may be stub functions, for providing a mechanism to invoke functions of hardware component 512 in application domain 504. The stub functions may call methods of an object, or an instance of a class, within application domain 504 for communicating with hardware component 512 and causing a function to be performed. In this way, an application executing in one application domain may cause a function to be performed, with respect to a hardware component, defined to be in another application domain.

Exemplary Processes

Figure 6:
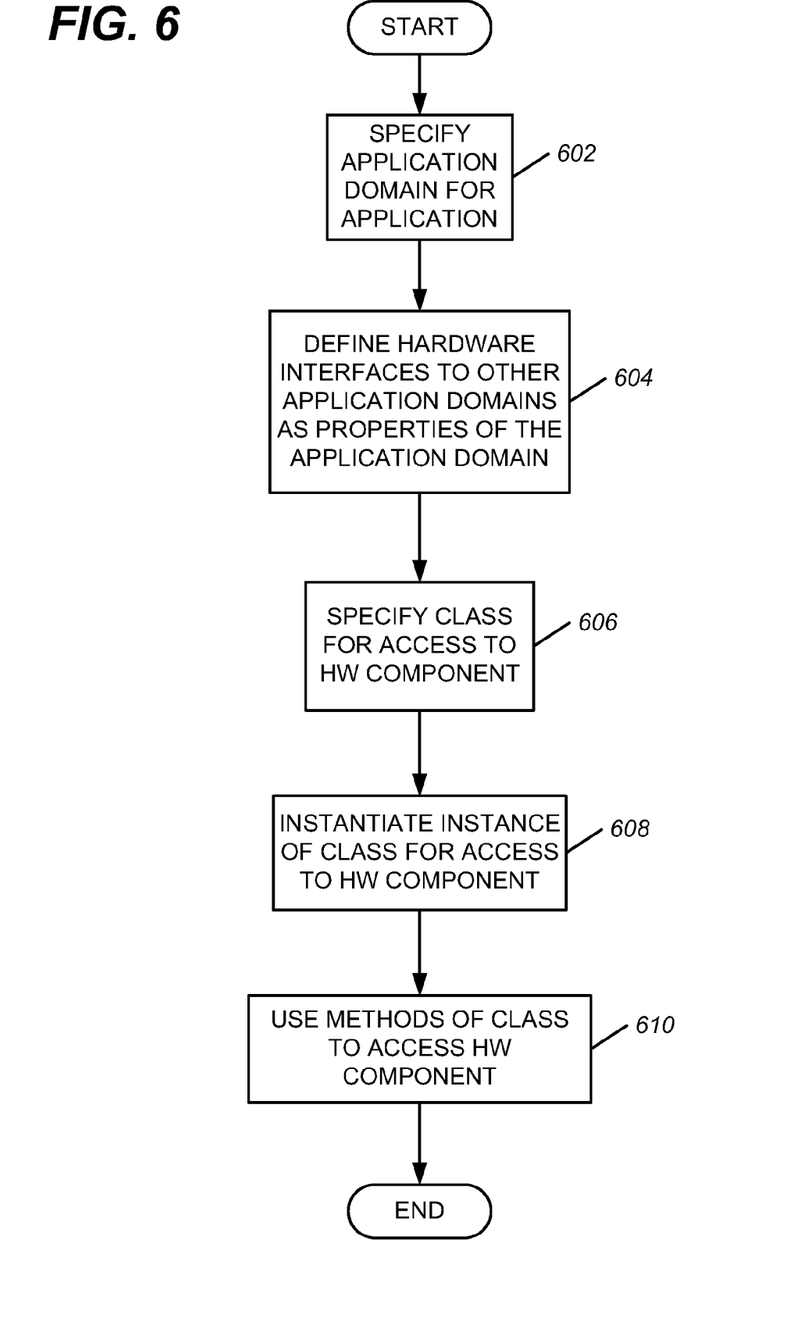
FIGS. 6 and 7 illustrate exemplary processes which may be performed with embodiments consistent with the subject matter of this disclosure.

FIG. 6 illustrates an exemplary process for specifying an application domain having an abstracted hardware component and accessing the hardware component. First, an application domain for an application may be specified on a platform using a programming language construct (act 602).

Hardware interfaces to other application domains may be defined as properties of the application domain, as discussed previously (act 604). A class for accessing a hardware component may be specified (act 606). The class may be included in a software library in some embodiments. The application may instantiate an instance of the class (act 608). The instance of the class may include methods for accessing the hardware component. The application may use the methods of the instantiated class to communicate with, or access, the hardware component (act 610). If the hardware component is in a same application domain as the application, then the application may use the methods, as described previously with reference to FIG. 4. If the hardware component is in a different application domain than the application, then the application may use the methods via a proxy object, as described previously with reference to FIG. 5.

Figure 7:
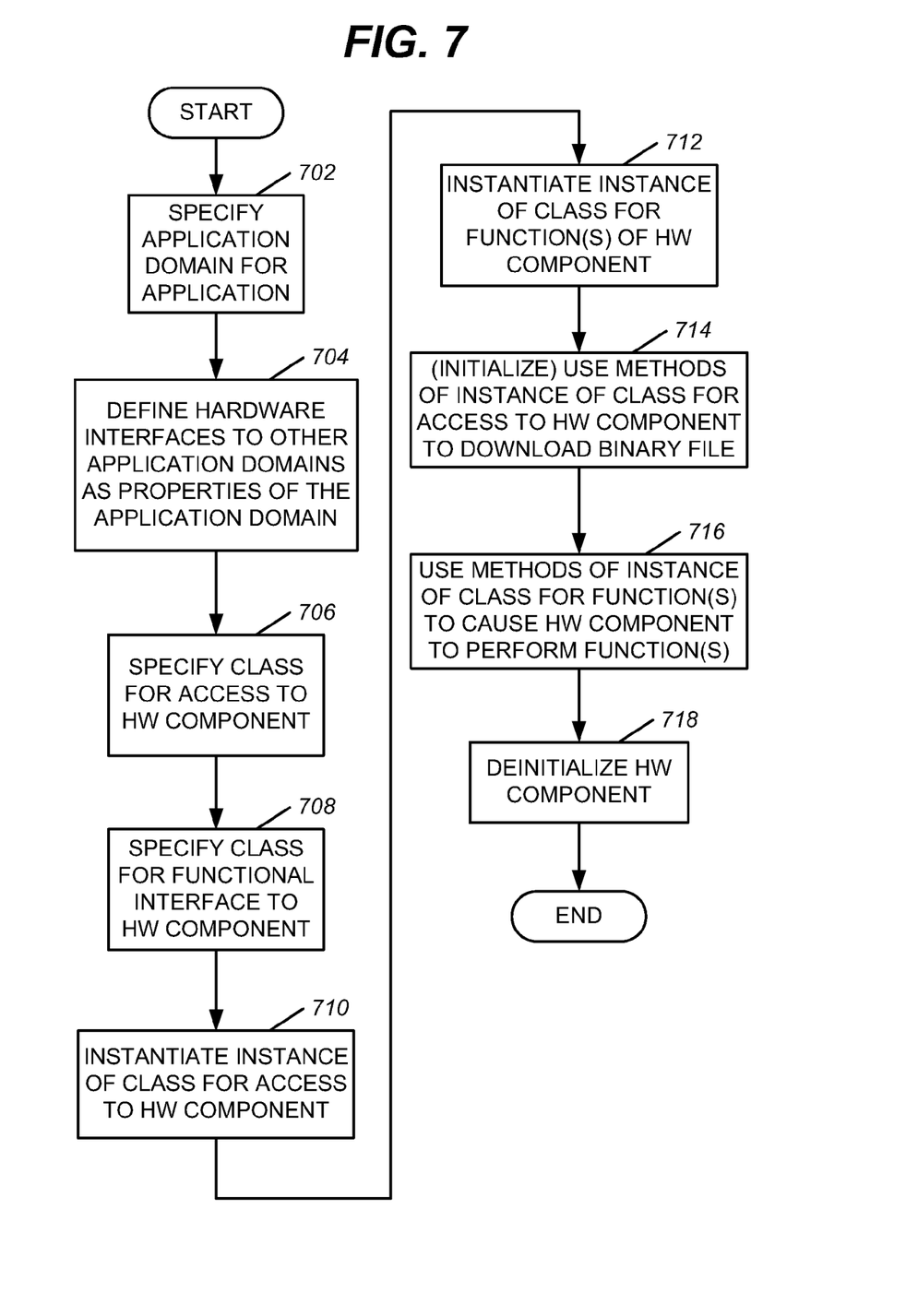

FIG. 7 illustrates another exemplary process for specifying an application domain having an abstracted hardware component, for initializing the hardware component from the application, for invoking functions of the hardware component from the application, and for the deinitializing the hardware component from the application.

First, an application domain for an application may be specified on a platform using a programming language construct (act 702). Hardware interfaces to other application domains may be defined as properties of the application domain, as discussed previously (act 704). A class for accessing a hardware component may be specified (act 706). The class may be specified in a software library in some embodiments. A class for invoking functions of the hardware component may be specified (act 708). The application may instantiate an instance of the class for accessing the hardware component (act 710). The instance of the class may include methods for accessing the hardware component when the hardware component is included in a same application domain as the application, or stubs for accessing an object, in a different application domain, having methods for accessing the hardware component, when the hardware component is included in the different application domain. Next, an instance of the class for invoking functions of the hardware component may be instantiated (act 712). Methods of the instance of the class may include stubs in a proxy object for communicating a function call to an instance of a class in the different application domain, including the hardware component, or the instance of the class may include methods for invoking functions of the hardware component when the application and the hardware component are in a same application domain. The application may initialize the hardware component by using methods of the instance of the class for accessing the hardware component in order to download information to the hardware component. The information may include code or configuration information in a binary file, or code for the hardware component to perform functions (act 714). Of course, the information may be downloaded to the hardware component at a later time, such as during runtime. The application may use methods of the instance of the class for causing the hardware component to perform the functions (act 716). The application may then use a method to inform the hardware component to deinitialize and to release any resources used by the hardware component (act 718).

Embodiments consistent with the subject matter of this disclosure provide a consistent method for users such as, programmers, to specify application domains, hardware components, and software components, such that applications may access hardware components, may invoke functions, and may access software components, in a consistent and well-defined manner within a managed code environment.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. Further, implementations consistent with the subject matter of this disclosure may have more or fewer acts than as described with respect to FIGS. 6 and 7, or may implement acts in a different order than as shown. Accordingly, the appended claims and their legal equivalents define the invention, rather than any specific examples given.

We claim as our invention:

1. A machine-implemented method for providing hardware abstraction for an application executing in an embedded system environment, the machine-implemented method comprising:
   providing a platform for executing an application in a managed code environment within a first application domain, the platform being included in a system; and
   providing, by the platform, a method for specifying a second application domain, which abstracts a hardware device, such that the hardware device is to be accessible by the application, via a generic interface, the application to be executed in the managed code environment within the first application domain, wherein:
   the first application domain and the second application domain are isolated from other application domains by partitioning the system into a plurality of independent applications with fixed public interfaces and blocking other access among the first application domain, the second application domain and the other application domains.

2. The machine-implemented method of claim 1, wherein the hardware device includes a special purpose processor.

3. The machine-implemented method of claim 1, wherein the hardware device includes a digital signal processor, a graphics processing unit, a field programmable gate array, or an application specific integrated circuit.

4. The machine-implemented method of claim 1, further comprising:
   enforcing, by the platform, managed code features for the application executing in the managed code environment.

5. The machine-implemented method of claim 4, wherein the managed code features include code access security, code verification, non-functional constraint validation, and application domain isolation.

6. The machine-implemented method of claim 1, further comprising:
   downloading, by the application executing in the managed code environment, a binary file to the hardware.

7. The machine-implemented method of claim 1, further comprising:
   accessing the hardware device from the application executing in the managed code environment.

8. A system comprising:
   a platform for executing an application in a managed code environment within a first application domain; and
   a second application domain which abstracts a hardware device, such that the hardware device is accessible by the application executing in the managed code environment within the first application domain via a generic interface, wherein:
   the first application domain and the second application domain are isolated from other application domains by partitioning the system into a plurality of independent applications with fixed public interfaces and blocking other access among the first application domain, the second application domain and the other application domains.

9. The system of claim 8, wherein:
   the first application domain or the second application domain includes at least one hardware interface specified as an application domain property.

10. The system of claim 9, wherein the at least one hardware interface comprises at least one of a memory region, a hardware interrupt, or an input/output bus.

11. The system of claim 8, wherein the hardware device includes a programmable device.

12. The system of claim 11, wherein the programmable device includes a digital signal processor, or a graphics processing unit.

13. The system of claim 8, wherein:
   the platform enforces managed code features for the application, and
   the managed code features include code access security, code verification, non-functional constraint validation, and application domain isolation.

14. A machine-readable storage device comprising instructions for at least one processor to perform a method comprising:
   providing a platform for executing an application in a managed code environment within an application domain;
   providing, by the platform, a method for specifying an application domain which abstracts a hardware device, such that the hardware device is accessible by an application executing within a same application domain as the hardware device or within a different application domain than the application domain of the hardware device, wherein:
   each of a plurality of application domains is isolated from others of the plurality of application domains by partitioning a system, that includes the platform, into a plurality of independent applications with fixed public interfaces, and blocking other access among the plurality of application domains.

15. The machine-readable storage device of claim 14, wherein the method further comprises:
   permitting an application to load, via a generic interface in the managed code environment, a binary file to a hardware device.

16. The machine-readable storage device of claim 14, wherein the method further comprises:
   de-initializing, by an application, a hardware device via a generic interface in the managed code environment.

17. The machine-readable storage device of claim 14, wherein the method further comprises:
   permitting an application to download instructions to a hardware device via a generic interface from within the managed code environment; and
   providing an application with a generic interface for invoking functions of the hardware device, that includes the downloaded instructions, from within the managed code environment.

18. The machine-readable storage device of claim 14, wherein the hardware device is a field programmable gate array, a digital signal processor, a graphic processor, or an application specific integrated circuit.

19. The machine-readable storage device of claim 14, wherein the hardware device is a programmable device.

20. The machine-implemented method of claim 1, wherein the method further comprises:

instantiating the generic interface, including a proxy object in the first application domain, for communicating with the hardware device abstracted by the second application domain.

* * * * *